United States Patent
Comer et al.

(10) Patent No.: US 12,053,703 B2
(45) Date of Patent: Aug. 6, 2024

(54) DETERMINATION OF A PARAMETER SETTING BASED ON A CALIBRATION RELATIONSHIP FOR AN INFORMATION HANDLING SYSTEM

(71) Applicant: Dell Products L.P., Round Rock, TX (US)

(72) Inventors: Ryan Nicholas Comer, Round Rock, TX (US); Marc Randall Hammons, Round Rock, TX (US); Tyler Ryan Cox, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 225 days.

(21) Appl. No.: 17/657,458

(22) Filed: Mar. 31, 2022

(65) Prior Publication Data

US 2023/0311006 A1 Oct. 5, 2023

(51) Int. Cl.
*A63F 13/77* (2014.01)

(52) U.S. Cl.
CPC .................... *A63F 13/77* (2014.09)

(58) Field of Classification Search
CPC ........ A63F 13/77; A63F 13/355; A63F 13/42; A63F 13/22
USPC .......................................................... 463/43
See application file for complete search history.

(56) References Cited

U.S. PATENT DOCUMENTS

| | | | | |
|---|---|---|---|---|
| 10,466,955 | B1* | 11/2019 | Gray | G06F 3/165 |
| 11,474,773 | B2* | 10/2022 | Schaer | G06F 3/167 |
| 2012/0056911 | A1* | 3/2012 | Safaee-Rad | G09G 3/2003 |
| | | | | 345/690 |
| 2015/0262207 | A1* | 9/2015 | Rao | G06Q 30/0242 |
| | | | | 705/7.32 |
| 2016/0188109 | A1* | 6/2016 | Wang | G06F 3/0418 |
| | | | | 345/173 |
| 2019/0090158 | A1* | 3/2019 | Das | H04L 67/12 |
| 2020/0383598 | A1* | 12/2020 | Craik | A61B 5/369 |
| 2023/0033396 | A1* | 2/2023 | Schaer | G06F 16/909 |

* cited by examiner

*Primary Examiner* — Michael A Cuff
(74) *Attorney, Agent, or Firm* — Norton Rose Fulbright LLP

(57) ABSTRACT

An apparatus includes a memory and one or more processors coupled to the memory. The one or more processors are configured to determine a first setting of a first parameter associated with a first device. The first device is associated with a first device type. The one or more processors are further configured to detect an event. The event is associated with one of the first parameter or a second device that is associated with a second parameter, and the second device is associated with a second device type. The one or more processors are further configured to determine, based on detecting the event, a second setting of the second parameter for the second device based on a calibration relationship between the first parameter and the second parameter.

20 Claims, 9 Drawing Sheets

| Ecosystem Devices | Video Output | Video Input (e.g. Webcam) | Audio Output | Audio Input | Button Input | Range Input | Toggle Input | RGB Output | Haptic Output |
|---|---|---|---|---|---|---|---|---|---|
| Handheld Device | ✓ | ✓ | ✓ | ✓ | ✓ | ✓ | ✓ | ✓ | ✓ |
| Display | ✓ | ✓ | ✓ |  |  |  |  | ✓ |  |
| Controller |  |  |  |  | ✓ | ✓ | ✓ | ✓ | ✓ |
| Mouse |  |  |  |  | ✓ | ✓ |  | ✓ |  |
| Keyboard |  |  |  |  | ✓ |  |  | ✓ |  |
| Handset |  |  | ✓ | ✓ |  |  | ✓ | ✓ |  |
| AR/VR Input | ✓ | ✓ |  |  |  | ✓ |  |  |  |
| Detachable Controller | ✓ | ✓ | ✓ | ✓ | ✓ | ✓ | ✓ |  | ✓ |
| BCI | ✓ | ✓ | ✓ | ✓ | ✓ | ✓ | ✓ | ✓ | ✓ |

*FIGURE 2*

DETERMINATION OF A PARAMETER SETTING BASED ON A CALIBRATION RELATIONSHIP FOR AN INFORMATION HANDLING SYSTEM

FIELD OF THE DISCLOSURE

The instant disclosure relates to information handling systems. More specifically, some portions of this disclosure relate to configuring settings of parameters associated with peripheral devices of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Users may interact with information handling systems using an increasing variety of peripheral devices. For example, such peripheral devices may include devices such as a mouse, a keyboard, a game controller, a display, a speaker, or a microphone. Such devices may provide a user-generated input to an information handling system, may generate an output based on commands from an information handling system, or both.

Some users may change peripheral devices or may use multiple different peripheral devices (e.g., by changing peripheral devices during gameplay of a video game). For example, a player of a video game may have different gaming "setups" in different rooms, where each room has a different set of peripheral devices that the player may use during gameplay.

In some cases, different configurations among different peripheral devices may cause different user experiences across the different peripheral devices and may fail to match the needs of a user in some cases. For example, a player of a video game may change from playing in one room using a computer monitor, keyboard, and mouse to streaming the video game in another room using a television and a game controller. In this case, the user may experience a change in configurations between the computer monitor, keyboard, and mouse compared to the television and game controller, which may be undesirable in some cases (e.g., by causing a change in user experience).

SUMMARY

In some aspects of the disclosure, an information handling system may increase cohesiveness of user experience by automatically propagating a change of one setting of one device to another setting of another device based on a calibration relationship between the devices. For example, the information handling system may determine that a first parameter of a first device is related to a second parameter of a second device (e.g., that the parameters are similar or are associated with a common user experience) and may use the calibration relationship to determine, based on a change to the first parameter, an amount of corresponding change to apply to the second parameter (e.g., whether to increase or decrease the second parameter). In some implementations, the first device is associated with a first device type (or class), and the second device is associated with a second device type (or class) different than the first device type. To further illustrate, in some examples, the first device type may correspond to one of, and the second device type may correspond to another of, a game controller device type, a joystick device type, a mouse device type, a keyboard device type, a display device type, a speaker device type, a microphone device type, a headset device type, a virtual reality (VR) device type, an augmented reality (AR) device type, a vehicle control simulation device type, a musical instrument simulation device type, or a brain-computer interface (BCI) device type. Accordingly, in some examples, a change in a setting associated with one device class (such as a keyboard) may be propagated to a change in setting associated with another device class (such as a controller). Other examples are also within the scope of the disclosure.

In some examples, the information handling system may perform the adjustment of the second parameter based on an initial configuration or a reconfiguration of the first parameter. Alternatively or in addition, the information handling system may detect the addition of the second device to a gaming system (also referred to as registering or enrolling the second device within the gaming system) and may automatically propagate a setting of the first parameter to the second parameter.

By automatically propagating a parameter setting associated with one device to a parameter setting of another device, settings among different devices used to access an information handling system may be homogenized in some cases. As a result, user experience is enhanced, such as by increasing the cohesiveness of an experience of a user during a change from playing a video game on one type of system (e.g., a computer) to another type of system (e.g., by streaming the video game from the computer to a television or a phone).

Further, one or more features described herein may reduce an amount of signaling transmitted in a gaming system and may increase an amount of computing resources or communication resources available for other operations. For example, in some conventional systems, users may individually configure settings of peripheral devices, which may be time consuming and which may use processing resources of a computing device as well as communication resources to transmit and receive commands to change settings of peripheral devices. By automatically configuring settings of peripheral devices using one or more techniques described herein, an amount of commands transmitted to change the settings may be reduced, which may increase an amount of computing resources or communication resources available for other operations in some cases.

In some aspects, an apparatus includes a memory and one or more processors coupled to the memory. The one or more processors are configured to determine a first setting of a first parameter associated with a first device. The first device is associated with a first device type. The one or more processors are further configured to detect an event that is associated with one of the first parameter or a second device that is associated with a second parameter. The second device is associated with a second device type. The one or more processors are further configured to determine, based on detecting the event, a second setting of the second parameter for the second device based on a calibration relationship between the first parameter and the second parameter.

In some aspects, the one or more processors are further configured to access, based on detecting the event, a parameter matrix that indicates that the first parameter corresponds to the second parameter.

In some aspects, the parameter matrix indicates a plurality of devices and, a plurality of parameters, and, for each parameter of the plurality of parameters and for each device of the plurality of devices, an indication of whether the parameter is associated with the device.

In some aspects, the one or more processors are further configured to update the parameter matrix to indicate that the second device is associated with one or more parameters including the second parameter.

In some aspects, the one or more processors are further configured to determine the calibration relationship based on calibration data.

In some aspects, the calibration data includes one or more of game session metadata associated with a particular game, crowdsourcing data indicating detected values associated with the first parameter and the second parameter, experience feature relationships between the first parameter and the second parameter, or device metadata associated with one or more of the first device or the second device.

In some aspects, the experience feature relationships indicate a correlation between the first parameter and the second parameter, and the one or more processors are further configured to determine a first amount of change associated with the first parameter, to determine, based on the correlation and the first amount of change, a second amount of change for the second parameter, and to adjust a current value of the second parameter based on the second amount of change to determine the second setting.

In some aspects, the one or more processors are further configured to detect the event by detecting that a configuration profile does not indicate the second device and to store an indication of the second setting of the second parameter to the configuration profile.

In some aspects, the configuration profile corresponds to one or more of a particular game associated with a gaming system, a particular player of the gaming system, or a particular geographic location associated with the gaming system.

In some aspects, the one or more processors are further configured to detect the event based on one of receiving an initial configuration of the first setting, receiving a reconfiguration of the first setting, or receiving the first setting via a crowdsourcing technique.

In some aspects, the one or more processors are further configured to detect the event based on one of receiving an initial configuration of the first setting, receiving a reconfiguration of the first setting, or receiving registration of the second device within a gaming system.

In some aspects, the one or more processors are further configured to perform a machine learning operation to determine the calibration relationship based on first experience feature values associated with the first device type and further based on second experience feature values associated with the second device type.

In some aspects, the apparatus further includes an information handling system that includes the memory and the one or more processors.

In some aspects, a method includes determining a first setting of a first parameter associated with a first device. The first device is associated with a first device type. The method further includes detecting an event that is associated with one of the first parameter or a second device that is associated with a second parameter. The second device is associated with a second device type. The method further includes, based on detecting the event, determining a second setting of the second parameter for the second device based on a calibration relationship between the first parameter and the second parameter.

In some aspects, the method further includes, based on detecting the event, accessing a parameter matrix that indicates that the first parameter corresponds to the second parameter.

In some aspects, the parameter matrix indicates a plurality of devices, a plurality of parameters, and, for each parameter of the plurality of parameters and for each device of the plurality of devices, an indication of whether the parameter is associated with the device.

In some aspects, the method includes updating the parameter matrix to indicate that the second device is associated with one or more parameters including the second parameter.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

In some aspects, an information handling system includes a memory and a processor coupled to the memory. The processor is configured to determine a first setting of a first parameter associated with a first device. The first device is associated with a first device type. The processor is further configured to detect an event associated with one of the first parameter or a second device that is associated with a second parameter. The second device is associated with a second device type. The processor is further configured to determine, based on detecting the event, a second setting of the second parameter for the second device based on a calibration relationship between the first parameter and the second parameter.

In some aspects, the processor is further configured to detect the event based on one of receiving an initial configuration of the first setting, receiving a reconfiguration of the first setting, or receiving the first setting via a crowdsourcing technique.

In some aspects, the processor is further configured to detect the event based on one of receiving an initial configuration of the first setting, receiving a reconfiguration of the first setting, or receiving registration of the second device within a gaming system.

Some examples herein may be implemented using an information handling system. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

BRIEF DESCRIPTION OF THE DRAWINGS

For a more complete understanding of the disclosed system and methods, reference is now made to the following descriptions taken in conjunction with the accompanying drawings.

FIG. 2 depicts an illustrative example of a parameter matrix according to some aspects of the disclosure.

DETAILED DESCRIPTION

Figure 1:
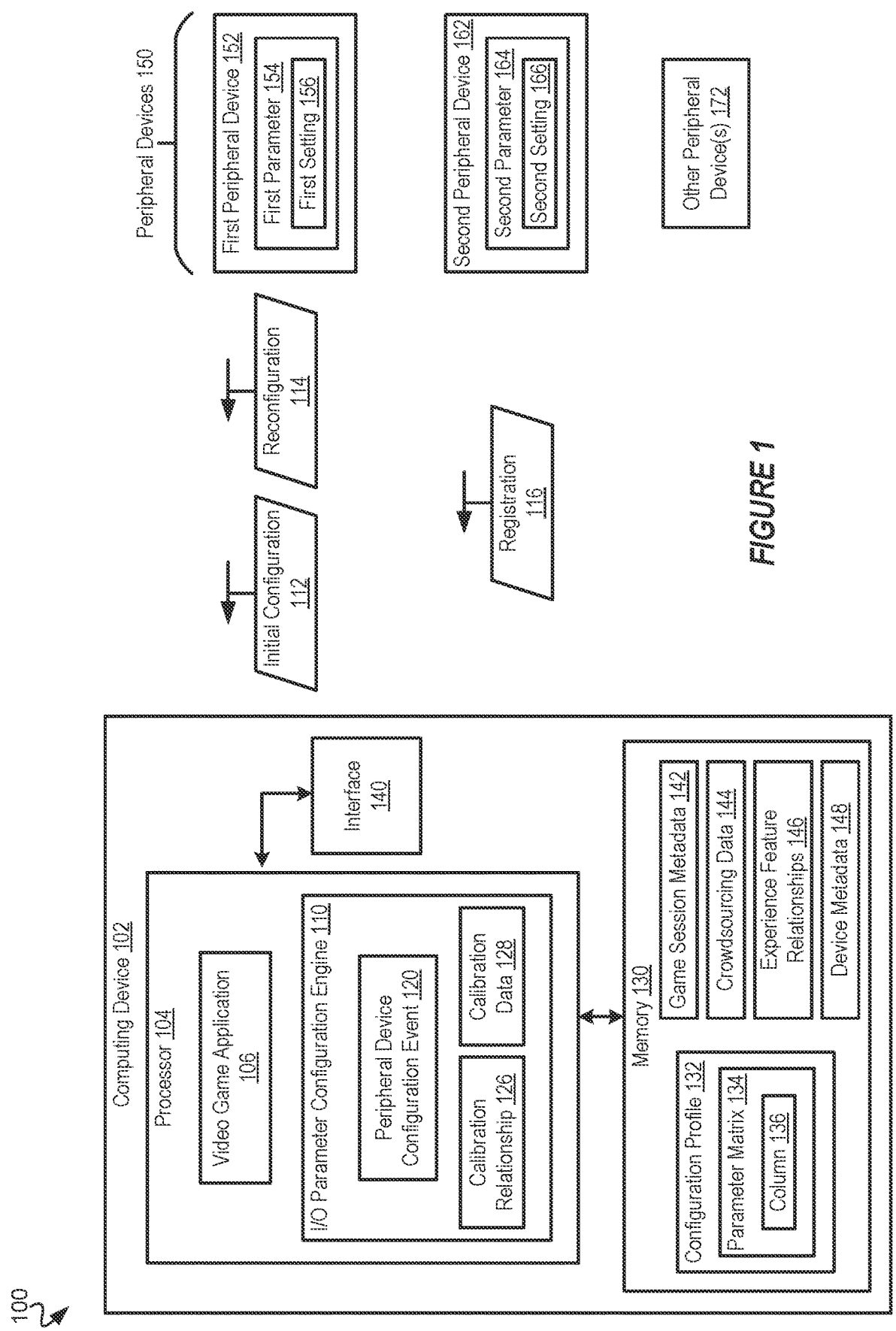
FIG. 1 is a block diagram illustrating an example of a gaming system according to some aspects of the disclosure.

FIG. 1 is a block diagram illustrating an example of a gaming system 100 according to some aspects of the disclosure. The gaming system 100 includes a computing device 102. In some implementations, the computing device 102 may include or correspond to a gaming console, a desktop computer, a laptop computer, a tablet, a mobile device, a server (e.g., a cloud server), or another type of computing device, as illustrative examples.

The computing device 102 may include one or more processors, such as a processor 104. The computing device 102 may further include a memory 130 and an interface 140 (e.g., a wireless interface or a wired interface). The processor 104 may be coupled to the memory 130 and to the interface 140.

The gaming system 100 may further include peripheral devices 150. For example, the peripheral devices 150 may include a first peripheral device 152, a second peripheral device 162, and one or more other peripheral devices 172. Each of the peripheral devices 150 may include a processor, a memory, and an interface that communicates with the computing device 102.

Each of the peripheral devices 150 may include one or both of an input device that receives user input (such as user operation of a button or other input device) or an output device that generates an output (such as one or more of an audio output, a visual output, a haptic output, or another output). To illustrate, one or more of the peripheral devices 150 may be configured to receive user input and to transmit signals to the computing device 102 based on the user input (e.g., via a wired or wireless connection to the computing device 102). Alternatively or in addition, one or more of the peripheral devices 150 may be configured to receive commands from the computing device 102 (e.g., via a wired or wireless connection to the computing device 102) and to generate an output (such as one or more of an audio output, a visual output, a haptic output, or another output) based on the commands.

To further illustrate, in some examples, one or more of the peripheral devices 150 may correspond to a game controller (e.g., a gamepad or a joystick controller), a mouse, a keyboard, a display, a speaker, a microphone, a headset, a virtual reality (VR) device, an augmented reality (AR) device, a vehicle control simulation device (such as a racing wheel or a vehicle pedal assembly), a musical instrument simulation device (such as a guitar controller), a detachable controller, or a brain-computer interface (BCI) device, as illustrative examples. In some implementations, one or more of the peripheral devices 150 may correspond to a streaming device that streams gaming content from the computing device 102. For example, one or more of the peripheral devices 150 may correspond to a handheld gaming device, a phone, a tablet, or a computer that streams gaming content from the computing device 102.

In some examples, at least some of the peripheral devices 150 may be associated with different device types as compared to one or more other peripheral devices of the peripheral devices 150. For example, the first peripheral device may be associated with a first device type, and the second peripheral device 162 may be associated with a second device type that is different than the first device type. To further illustrate, in some examples, the first device type may correspond to one of a game controller device type, a joystick device type, a mouse device type, a keyboard device type, a display device type, a speaker device type, a microphone device type, a headset device type, a VR device type, an AR device type, a vehicle control simulation device type, a musical instrument simulation device type, or a BCI device type, and the second device type may correspond to another of the game controller device type, the joystick device type, the mouse device type, the keyboard device type, the display device type, the speaker device type, the microphone device type, the headset device type, the VR device type, the AR device type, the vehicle control simulation device type, the musical instrument simulation device type, or the BCI device type. Other examples are also within the scope of the disclosure.

The computing device 102 may communicate with the peripheral devices 150 via one or more networks or other connections. The one or more networks may include a local area network (LAN), a wireless LAN (WLAN), a wide area network (WAN), a wireless network (e.g., a cellular network), a wired network, the Internet, one or more other networks, or a combination thereof.

Although the peripheral devices 150 are illustrated as being external to the computing device 102, in some other examples, one or more of the peripheral devices 150 may be included or integrated within the computing device 102. For example, in some implementations, one of the peripheral devices 150 may include a display device or a speaker that is integrated within the computing device 102.

During operation, the computing device 102 may execute a video game application 106. For example, the processor 104 may load the video game application 106 from the memory 130 and may execute the video game application 106 based on user input received via one or more of the peripheral devices 150.

The computing device 102 may execute an input/output (I/O) parameter configuration engine 110 and may store a configuration profile 132 that are associated with the peripheral devices 150. The computing device 102 may use the I/O parameter configuration engine 110 and the configuration profile 132 to perform one or more operations described herein, such as to configure and reconfigure parameters of the peripheral devices 150.

To illustrate, the I/O parameter configuration engine 110 may determine a first setting 156 of a first parameter 154 associated with the first peripheral device 152. As an illustrative example, the first setting 156 may be designated by a user of the first peripheral device 152, such as in connection with an initial configuration 112 of the first setting 156 (e.g., where the first parameter 154 has not previously been defined or configured prior to determining the first setting 156). In such examples, the computing device 102 may receive user input from the first peripheral device 152 (or from another source) indicating the first setting 156. The computing device 102 may input an indication of the first setting 156 to the I/O parameter configuration engine 110, and the I/O parameter configuration engine 110 may update the configuration profile 132 to indicate the first setting 156. In some other examples, the first setting 156 may be determined using one or more other techniques described herein.

To illustrate, in some other examples, the first setting 156 may be determined using crowdsourcing from another user. For example, the first peripheral device 152 may be associated with a crowdsourced user (e.g., a popular or influential gamer), the second peripheral device 162 may be associated with a user different than the crowdsourced user, and determining the first setting 156 may include receiving the first setting 156 at the computing device 102 via a crowdsourcing technique. In such examples, settings associated with one user may be used to determine or reconfigure settings of another user, as described further with reference to the example of FIG. 6.

After determining the first setting 156 of the first parameter 154, the computing device 102 may detect a peripheral device configuration event 120 associated with gameplay of the video game application 106. In some aspects of the disclosure, the computing device 102 may determine one or more parameter settings based on detecting the peripheral device configuration event 120.

To illustrate, in some examples, the peripheral device configuration event 120 may include or correspond to a registration 116 of the second peripheral device 162 within the gaming system 100. To further illustrate, in some cases, a new peripheral device may be added to the gaming system 100, such as by adding the second peripheral device 162 to the gaming system 100. Adding the second peripheral device 162 to the gaming system 100 may also be referred to as enrolling the second peripheral device 162 in the gaming system 100 or registering the second peripheral device 162 in the gaming system 100.

Detecting the registration 116 may include receiving user input from the second peripheral device 162 and detecting that the second peripheral device 162 is not "recognized" by the computing device 102. To illustrate, the computing device 102 may access the configuration profile 132 to determine whether the second peripheral device 162 is associated (or registered) with the gaming system 100. If computing device 102 detects that the configuration profile 132 does not indicate the second peripheral device 162, the computing device 102 may detect the registration 116.

Alternatively or in addition, the peripheral device configuration event 120 may include or correspond to another event, such as the initial configuration 112 of the first parameter 154 or a reconfiguration 114 of the first parameter 154. To illustrate, the reconfiguration 114 may include reconfiguration of the first parameter 154, such as a reconfiguration of the first setting 156 (e.g., based on user input changing the first setting 156).

Based on detecting the peripheral device configuration event 120, the computing device 102 may determine that a second parameter 164 associated with the second peripheral device 162 corresponds to the first parameter 154 associated with the first peripheral device 152. For example, if the peripheral device configuration event 120 includes registration of the second peripheral device 162, the computing device 102 may access the configuration profile 132 to identify one or more settings of one or more other peripheral devices 150 that are similar to the second parameter 164 to be used for configuration of the second parameter 164 (e.g., to "preconfigure" the second parameter 164 based on one or more other parameters). As another example, if the peripheral device configuration event 120 includes reconfiguration of the first parameter 154, the computing device 102 may access the configuration profile 132 to identify one or more settings of one or more other peripheral devices 150 that are similar to first parameter 154 and that are to be updated based on the reconfiguration of the first parameter 154 (e.g., so that a change to the first parameter 154 is propagated to one or more other parameters).

As referred to herein, the first parameter 154 may correspond to the second parameter 164 if the parameters 154, 164 are associated with similar user experiences or if a change in one of the parameters 154, 164 is associated with (e.g., correlated with) a change in the other of the parameters 154, 164. As an illustrative example, the first peripheral device 152 may correspond to a mouse device, the first parameter 154 may correspond to mouse sensitivity, the second peripheral device 162 may correspond to a controller or joystick device, and the second parameter 164 may correspond to controller or joystick sensitivity. In such examples, the mouse sensitivity and the controller or joystick sensitivity may be experienced by a user in a similar manner and may be indicated as corresponding parameters by the configuration profile 132. Another example of corresponding parameters may be button mapping for devices with different arrangements of buttons. For example, the first parameter 154 may correspond a button mapping of a gamepad controller, and the second parameter 164 may correspond to button mapping of a keyboard or mouse. In another example, the first parameter 154 may correspond to gain in a headset microphone, and the second parameter 164 may correspond to gain in a standing microphone. In some other examples, the parameters 154, 164 may correspond to brightness values or color palettes of devices that include displays or volume settings (e.g., whether mute is enabled) for devices that include speakers. Other examples are also within the scope of the disclosure.

In some examples, the configuration profile 132 indicates a parameter matrix 134. Based on detecting the peripheral device configuration event 120, the computing device 102 may access the parameter matrix 134, such as to identify that the first parameter 154 corresponds to the second parameter 164. In some implementations, inclusion of the first parameter 154 and the second parameter 164 in the same portion of the parameter matrix 134, such as a column 136 of the parameter matrix 134, may indicate that the first parameter 154 corresponds to the second parameter 164.

The parameter matrix 134 may indicate a plurality of peripheral devices associated with the gaming system 100 including at least the first peripheral device 152. The parameter matrix 134 may further indicate a plurality of parameters including at least the first parameter 154. The parameter matrix may further indicate, for each parameter of the plurality of parameters and for each peripheral device of the plurality of peripheral devices, an indication of whether the parameter is associated with the peripheral device.

To illustrate, FIG. 2 depicts an illustrative example of the parameter matrix 134 according to some aspects of the disclosure. In the example of FIG. 2, the horizontal axis (abscissa) may correspond to different parameters (or "experience verticals"), such as one or more of a video output, a video input (e.g., a webcam input), an audio output, an audio input, a button input, a range input, a toggle output, a red-green-blue (RGB) output, or a haptic output, as illustrative examples. In FIG. 2, the vertical axis (ordinate) may correspond to different devices of the peripheral devices 150 (or "ecosystem devices"), such as one or more of a handheld device, a display, a controller, a mouse, a keyboard, a headset, an AR or VR input, a detachable controller, or a BCI device, as illustrative examples. In some examples, the devices listed in the vertical axis of the parameter matrix 134 are currently enrolled devices within an ecosystem of a user.

In FIG. 2, a check in a particular cell may indicate that the corresponding device is associated with the corresponding parameter. Further, if a cell is unchecked, then the corresponding device may lack the corresponding feature. To illustrate, in some examples, the column 136 may indicate that the handheld device, the display, the AR or VR device, and the BCI device may be associated with the video output parameter. The column 136 may also indicate that the controller, the mouse, the keyboard, the headset, and the detachable controller may lack the video output parameter.

Further, although the example of FIG. 2 illustrates that cells may include checks (e.g., a binary value), it should be appreciated that the parameter matrix 134 may store settings associated with devices. For example, the first setting 156 may be stored in a cell of the parameter matrix 134 corresponding to the first peripheral device 152 and the first parameter 154. As another example, the second setting 166 may be stored in a cell of the parameter matrix 134 corresponding to the second peripheral device 162 and the second parameter 164. In some examples, each cell of the parameter matrix 134 may correspond to an object that includes multiple values. As an illustrative example, the multiple values may include a first value (e.g., a binary value) indicating whether the corresponding device is associated with the corresponding parameter and may further include a second value indicating a relationship to one or more other parameters or parameter settings. For example, the second value may indicate another parameter (e.g., another cell or column of the parameter matrix 134) and a relationship (e.g., an amount of correlation) to the other parameter.

Referring again to FIG. 1, the computing device 102 may use the parameter matrix 134 to determine that the first parameter 154 corresponds to the second parameter 164. To illustrate, the computing device 102 may identify, based on the first parameter 154, a particular column of the parameter matrix 134 associated with the first parameter 154. As an illustrative example, if the first peripheral device 152 corresponds to the handheld device and if the first parameter 154 corresponds to the video output parameter, then the computing device 102 may identify the column 136. Further, the computing device 102 may use the parameter matrix 134 to identify one or more devices associated with a parameter corresponding to the first parameter 154, such as any of the display, the AR or VR input, or the BCI device (e.g., where the column 136 indicates that the AR or VR input, and the BCI device are associated with the video output). In such examples, the video output parameter of any of the display, the AR or VR input, or the BCI device may correspond to the second parameter 164. In some examples, inclusion of the first parameter 154 and the second parameter 164 in a common portion of the parameter matrix 134, such as the column 136, may indicate that the first parameter 154 corresponds to the second parameter 164.

The computing device 102 may determine a calibration relationship 126 between the first parameter 154 and the second parameter 164 (e.g., based on accessing the parameter matrix 134). The calibration relationship 126 may indicate or may be associated with a first range of values of the first parameter 154 and a corresponding second range of values of the second parameter 164. For example, the calibration relationship 126 may correspond to a linear relationship (e.g., a positive linear relationship or a negative linear relationship), a non-linear relationship (e.g., a non-linear piecewise relationship), or another relationship, as illustrative examples. In some examples, the I/O parameter configuration engine 110 performs a machine learning operation to determine the calibration relationship 126, as described further with reference to the example of FIG. 7.

To further illustrate, the computing device 102 may determine the calibration relationship 126 based on calibration data 128. The calibration data 128 may include one or more of game session metadata 142 associated with a particular game (such as the video game application 106), crowdsourcing data 144 indicating detected values associated with the first parameter 154 and the second parameter 164, experience feature relationships 146 between the first parameter 154 and the second parameter 164, or device metadata 148 associated with one or more of the first peripheral device 152 or the second peripheral device 162. To further illustrate, the game session metadata 142 may include device settings observed from other players of the video game application 106, such as device settings observed for a particular gameplay duration, a particular level, or a particular character of the video game application 106. The crowdsourcing data 144 may indicate, for a setting of a particular parameter (such as the first parameter 154), a common or detected setting of another parameter (such as the second parameter 164) based on gameplay of other players. The experience feature relationships 146 may indicate that, if one of the parameters 154, 164 changes, whether the other of the parameters 154, 164 has a corresponding change, and if so, an amount of the corresponding change. The device metadata 148 may include one or more of a device type, a device manufacturer, or a device model, as illustrative examples.

The computing device 102 may determine a second setting 166 of the second parameter 164 based on the calibration relationship 126. The computing device 102 may determine the second setting 166 based on the calibration data 128, such as based on one or more of the game session metadata 142, the crowdsourcing data 144, experience feature relationships 146, or the device metadata 148.

To further illustrate, in some examples, the experience feature relationships 146 may indicate a correlation between the first parameter 154 and the second parameter 164. The computing device 102 may determine a first amount of change associated with reconfiguration of the first parameter 154 (e.g., a change in the first setting 156 associated with the reconfiguration 114). Based on the correlation and the first amount of change, the computing device 102 may determine a second amount of change for the second parameter 164. The computing device 102 may adjust a current value of the second parameter 164 based on the second amount of change to determine the second setting 166.

As a non-limiting illustrative example, the first setting 156 may correspond to a first number of dots per linear inch (DPI), such as where the first parameter 154 corresponds to a sensitivity parameter. The correlation between the first parameter 154 and the second parameter 164 may indicate that, for the first amount of change in the first number of DPI, that the second parameter 164 is to change by a second amount (e.g., by a second number of DPI). The computing device 102 may adjust a current setting of the second parameter 164 based on the second amount (e.g., by adding or subtracting the second number from the current setting) to determine the second setting 166.

To further illustrate, in some examples, the first parameter 154 may correspond a button mapping of a gamepad controller, and the second parameter 164 may correspond to button mapping of a keyboard or mouse. Input usage telemetry may be collected from users associated with multiple ecosystems, multiple games, or both. The input usage telemetry may indicating keys and buttons used for a particular game. The keys and buttons may be sorted by frequency of usage during gameplay and may be sorted based on the usage to obtain a mapping. Based on a change in operation by a user from one of the peripheral devices 150 to another of the peripheral devices 150, the mapping may be propagated to the other device.

In some implementations, the game session metadata 142, the crowdsourcing data 144, the experience feature relationships 146, and the device metadata 148 may each be associated with a respective priority of a priority scheme. For example, the experience feature relationships 146 may be associated with a higher priority as compared to the crowdsourcing data 144. In such examples, the I/O parameter configuration engine 110 may attempt to determine a setting based on the experience feature relationships 146 and may use the crowdsourcing data 144 to determine the setting if the experience feature relationships fail to provide sufficient data to determine the setting. Further, in some implementations, the I/O parameter configuration engine 110 may use the crowdsourcing data 144 to identify a setting if the parameter matrix 134 fails to indicate any corresponding parameters for a parameter being searched. In such examples, the I/O parameter configuration engine 110 may "default" to using the crowdsourcing data 144.

The computing device 102 may update the configuration profile 132 based on one or more of the first setting 156 (e.g., in response to reconfiguration of the first setting 156) or the second setting 166 (e.g., in response to reconfiguration of the first setting 156 or in response to registration of the second peripheral device 162), such as by adjusting a value indicated by a cell of the parameter matrix 134. For example, the computing device 102 may store an indication of the first setting 156 to a cell of the parameter matrix 134 corresponding to the first peripheral device 152 and the first parameter 154. As another example, the computing device 102 may store an indication of the second setting 166 to a cell of the parameter matrix 134 corresponding to the second peripheral device 162 and the second parameter 164.

To further illustrate, upon registering the second peripheral device 162 within the gaming system 100, the computing device 102 may update the parameter matrix 134 to indicate that the second peripheral device 162 is associated with one or more parameters including the second parameter 164. For example, the computing device 102 may add a row within the parameter matrix 134, where the row corresponds to the second peripheral device 162. The row may include indications of whether the second peripheral device is associated with a particular parameter (or "experience vertical") for each column of the parameter matrix 134. For each parameter that is associated with the second peripheral device 162, the parameter matrix 134 may indicate a setting of the parameter (such as the second setting 166 of the second parameter 164).

The computing device 102 may use settings of parameters associated with the peripheral devices 150 during gameplay of one or more video games, such as during gameplay of the video game application 106. For example, the computing device 102 may access the configuration profile 132 to identify the second setting 166 of the second parameter 164 and may use the second setting 166 during gameplay of the video game application 106. In some examples, the computing device 102 may use the second setting 166 to process user input from the second peripheral device 162 (e.g., to determine an amount of cursor movement to generate based on a mouse input, where the second parameter corresponds to a mouse sensitivity). Alternatively or in addition, the computing device 102 may use the second setting 166 to determine an output command provided to the second peripheral device 162, such as one or more of an audio output command, a visual output command, a haptic output command, or another output command.

One or more features described herein may be used dynamically during gameplay to propagate changes from one device to another device. To illustrate, a user may dynamically change one or more of a mouse sensitivity of a mouse, an audio setting (such as a mute setting) of a speaker, a brightness setting of a display, or a primary color for a lighting device (such as a keyboard with an RGB lighting device). Based on receiving user input changing one or more of such parameters, the I/O parameter configuration engine 110 may propagate such changes to one or more other devices of the gaming system 100.

One or more aspects described herein may be used on a per-game basis, on a per-player basis, on a locational basis (e.g., for a particular household or other location, or for a particular room within the household or other location), on another basis, or a combination thereof. In some such examples, the memory 130 may store multiple configuration profiles 132 each corresponding to a different respective game, player, location, other criteria, or a combination thereof. Accordingly, the configuration profile 132 illustrated in FIG. 1 may correspond to one or more of a particular game (e.g., the video game application 106) associated with the gaming system 100, a particular player of the gaming system 100, or a particular geographic location associated with the gaming system 100. To illustrate, different players of the gaming system 100 may prefer different settings and may each be associated with a different configuration profile 132. In such examples, the memory 130 may store different configuration profiles 132 for different players of the gaming system 100.

Alternatively or in addition, one or more of the players may prefer different settings for different games. For example, a player may prefer one or more of a higher resolution or a lower framerate for more immersive games as compared to other games. As another example, a player may prefer one or more of a lower resolution or a higher framerate for more fast-paced or competitive games as compared to other games. As another example, a player may prefer one or more of different mouse sensitivities or different joystick sensitivities for different games. As an additional example, a player may prefer different audio settings (such as one or more of volume, equalization, balance, or compression) for different games. In such examples, the memory 130 may store multiple configuration profiles 132 corresponding to a different respective games.

One or more aspects described herein may enhance user experience. For example, by automatically propagating parameter setting associated with one of the peripheral devices 150 to a parameter setting of another of the peripheral devices 150, settings among the peripheral devices 150 may be homogenized in some cases. As a result, user experience may be enhanced, such as by increasing the cohesiveness of an experience of a user during a change from playing a video game on one type of device (e.g., the first peripheral device 152) to another type of device (e.g., the second peripheral device 162), such as if the user begins streaming the video game on the second peripheral device 162.

Further, one or more features described herein may reduce an amount of signaling transmitted in the gaming system 100 and may increase an amount of computing resources or communication resources available for other operations. For example, in some conventional systems, users may individually configure settings of peripheral devices, which may be time consuming and which may use processing resources of a computing device as well as communication resources to transmit and receive commands to change settings of peripheral devices. By automatically configuring settings of the peripheral devices 150 using one or more techniques described herein, an amount of commands transmitted to the computing device 102 to change the settings may be reduced, which may increase an amount of computing resources or communication resources available for other operations in the gaming system 100 in some cases.

Figure 3:
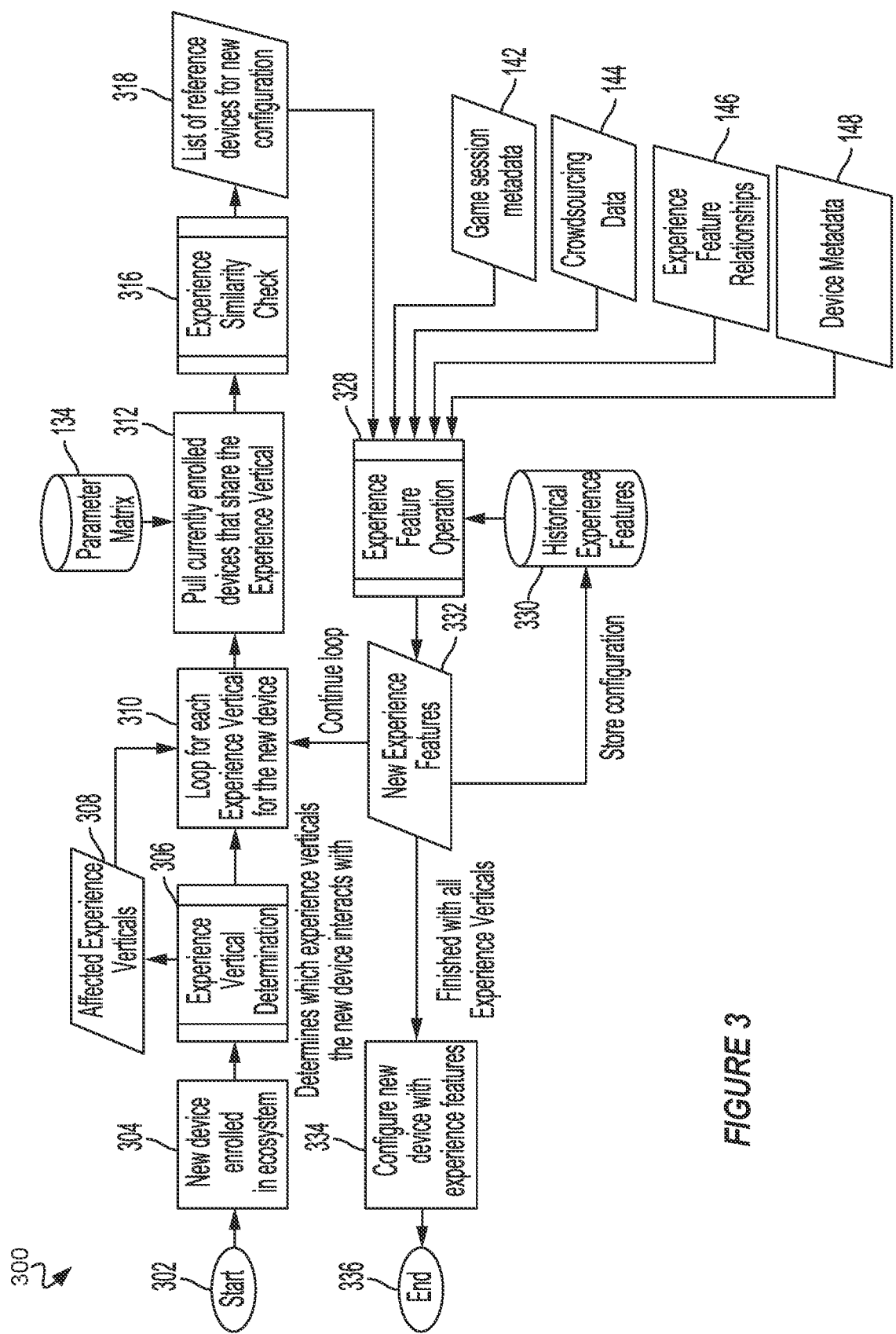
FIG. 3 is a flow chart of an example of a method according to some aspects of the disclosure.

FIG. 3 is a flow chart of an example of a method 300 according to some aspects of the disclosure. In some examples, one or more operations of the method 300 may be performed by the computing device 102. In some examples, operations of the method 300 may be performed based on enrollment of a device in a gaming system, such as enrollment of the second peripheral device 162 in the gaming system 100.

The method 300 may initiate, at 302, and may include identifying enrollment of a new device in an ecosystem, at 304. For example, the computing device 102 may identify enrollment of the second peripheral device 162 in the gaming system 100, such as by detecting the registration 116.

The method 300 may further include determining one or more experience verticals (e.g., by determining which experience verticals with which the new device interacts), at 306. For example, the computing device 102 may identify each column of the parameter matrix 134 that is associated with or applicable to the new device. The computing device 102 may generate an output indicating the experience verticals, at 308. The method 300 may further include looping each experience vertical for the new device, at 310.

The method 300 may further include pulling currently enrolled devices that share the one or more experience verticals, at 312. For example, the computing device 102 may access the parameter matrix 134 to identify devices of the peripheral devices 150 that share the one or more experience verticals. The computing device 102 may perform an experience similarity check, at 316, to identify a list of reference devices for configuration of the new device, at 318. For example, a device that shares one or more experience verticals with the new device may correspond to a reference device indicated by the list. As an example, the first peripheral device 152 may correspond to a reference device indicated by the list if the first peripheral device 152 shares an experience vertical with the new device.

The method 300 may further include performing an experience feature operation, at 328, such as by receiving the list of reference devices and generating an indication of new experience features based on the list of reference devices, at 332. In some examples, the experience feature operation is performed further based on one or more of the game session metadata 142, the crowdsourcing data 144, the experience feature relationships 146, or the device metadata 148. Alternatively or in addition, the experience feature operation may be performed further based on historical experience features 330. The list of new experience features may include parameters for the new device, such as the second setting 166 of the second parameter 164 for the second peripheral device 162. After generating the new experience features (at 332), the new experience features may be stored to the historical experience features 330. The historical experience features 330 may indicate timestamps indicating times at which the new experience features were configured.

The method 300 may further include configuring the new device with the experience features, at 334. For example, the computing device 102 may update the configuration profile 132 to indicate that the new experience features are associated with the new device and may apply the new experience features during gameplay of the video game application 106. The method 300 may end, at 336.

Figure 4:
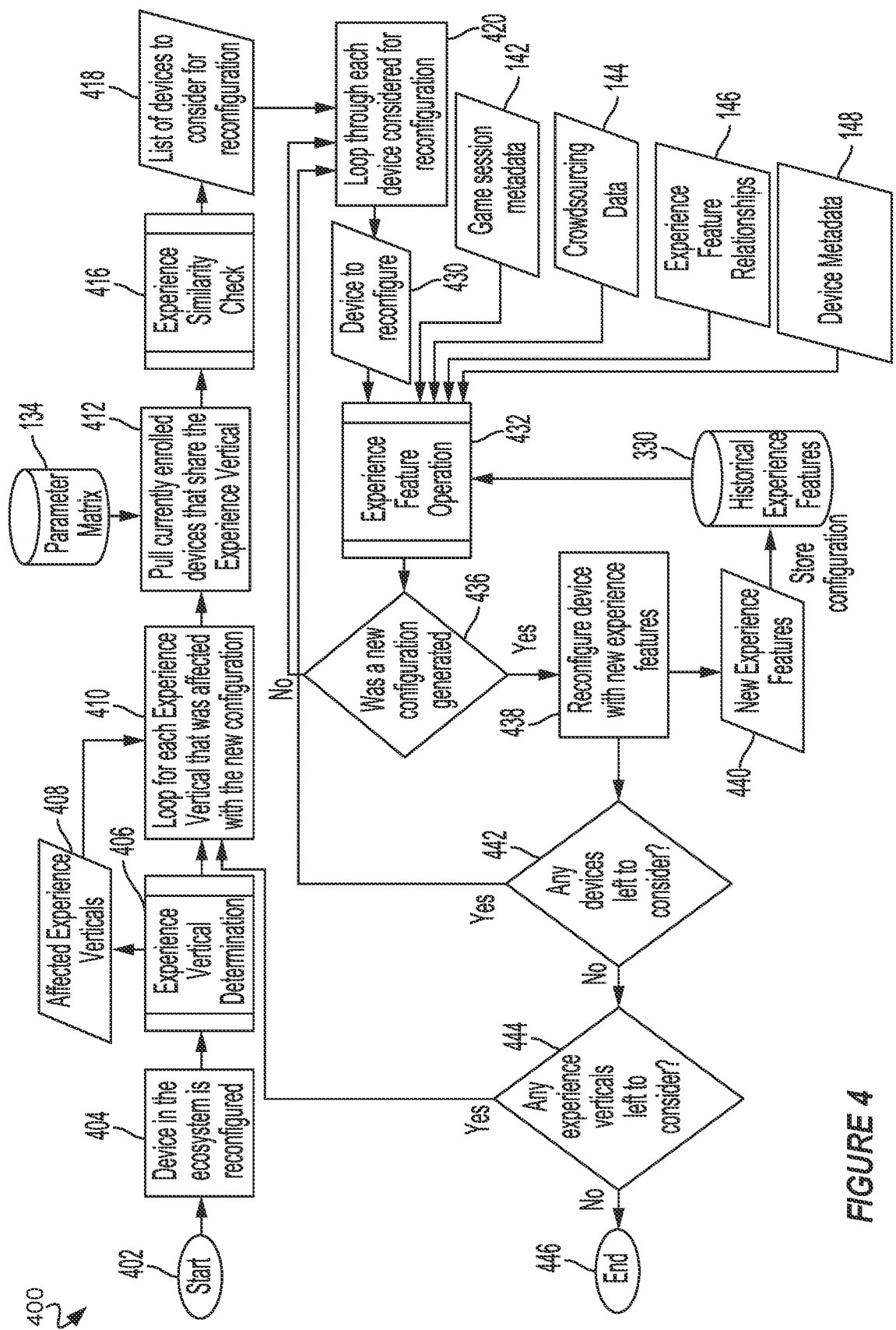
FIG. 4 is a flow chart of another example of a method according to some aspects of the disclosure.

FIG. 4 is a flow chart of an example of a method 400 according to some aspects of the disclosure. In some examples, one or more operations of the method 400 may be performed by the computing device 102. In some examples, operations of the method 400 may be performed based on reconfiguration of a setting of a parameter, such as based on reconfiguration of the first setting of the first parameter 154 in connection with the reconfiguration 114.

The method 400 may initiate, at 402, and may include detecting reconfiguration of a device in an ecosystem, at 404. For example, the computing device 102 may detect reconfiguration of the first setting 156 of the first parameter 154 in connection with the reconfiguration 114.

The method 400 may further include determining one or more experience verticals (e.g., by determining which experience verticals with which the device interacts), at 406. For example, the computing device 102 may identify each column of the parameter matrix 134 that is associated with or applicable to the device. The computing device 102 may generate an output indicating the experience verticals, at 408. The method 400 may further include looping each experience vertical for the device, at 410.

The method 400 may further include pulling currently enrolled devices that share the one or more experience verticals, at 412. For example, the computing device 102 may access the parameter matrix 134 to identify devices of the peripheral devices 150 that share the one or more experience verticals. The computing device 102 may perform an experience similarity check, at 416, to identify a list of candidate devices for reconfiguration, at 418. For example, devices that share one or more experience verticals with the reconfigured device may be indicated by the list. As an example, the second peripheral device 162 may be indicated by the list if the first peripheral device 152 shares an experience vertical with the second peripheral device 162. The method 400 may further include looping through each candidate device for reconfiguration, at 420, to determine a selected device for reconfiguration, at 430.

The method 400 may further include performing an experience feature operation based on the selected device for reconfiguration, at 432. In some examples, the experience feature operation is performed further based on the game session metadata 142, the crowdsourcing data 144, the experience feature relationships 146, and the device metadata 148, any of which may be included in the calibration data 128. Alternatively or in addition, the experience feature operation may be performed further based on the historical experience features 330.

The method 400 may further include determining whether a new configuration is generated, at 436. If no new configuration is generated, the method 400 may continue, at 420. If a new configuration is generated, the method 400 may further include reconfiguring the selected device for reconfiguration with one or more new experience features, at 438. For example, the computing device 102 may reconfigure the second peripheral device 162 with one or more new experience features, such as by reconfiguring the second peripheral device 162 with the second setting 166 of the second parameter 164. An output of the new experience features may be generated, at 440, and stored to the historical experience features 330.

The method 400 may further include determining whether one or more additional devices remain for to be considered for reconfiguration, at 442. For example, the computing device 102 may determine whether the parameter matrix 134 indicates one or more additional devices (or one or more additional rows of the parameter matrix 134) that have not been considered for reconfiguration. If one or more additional devices remain to be considered for reconfiguration, the method 400 may continue, at 420.

If no additional devices remain to be considered for reconfiguration, the method 400 may further include determining whether one or more experience verticals remain for consideration, at 444. For example, the computing device 102 may determine whether the parameter matrix 134 indicates one or more additional parameters (or one or more additional columns of the parameter matrix 134) that have not been considered for reconfiguration. If one or more additional parameters remain to be considered for reconfiguration, the method 400 may continue, at 410. If no additional parameters remain to be considered for reconfiguration, the method 400 may end, at 446.

Figure 5:
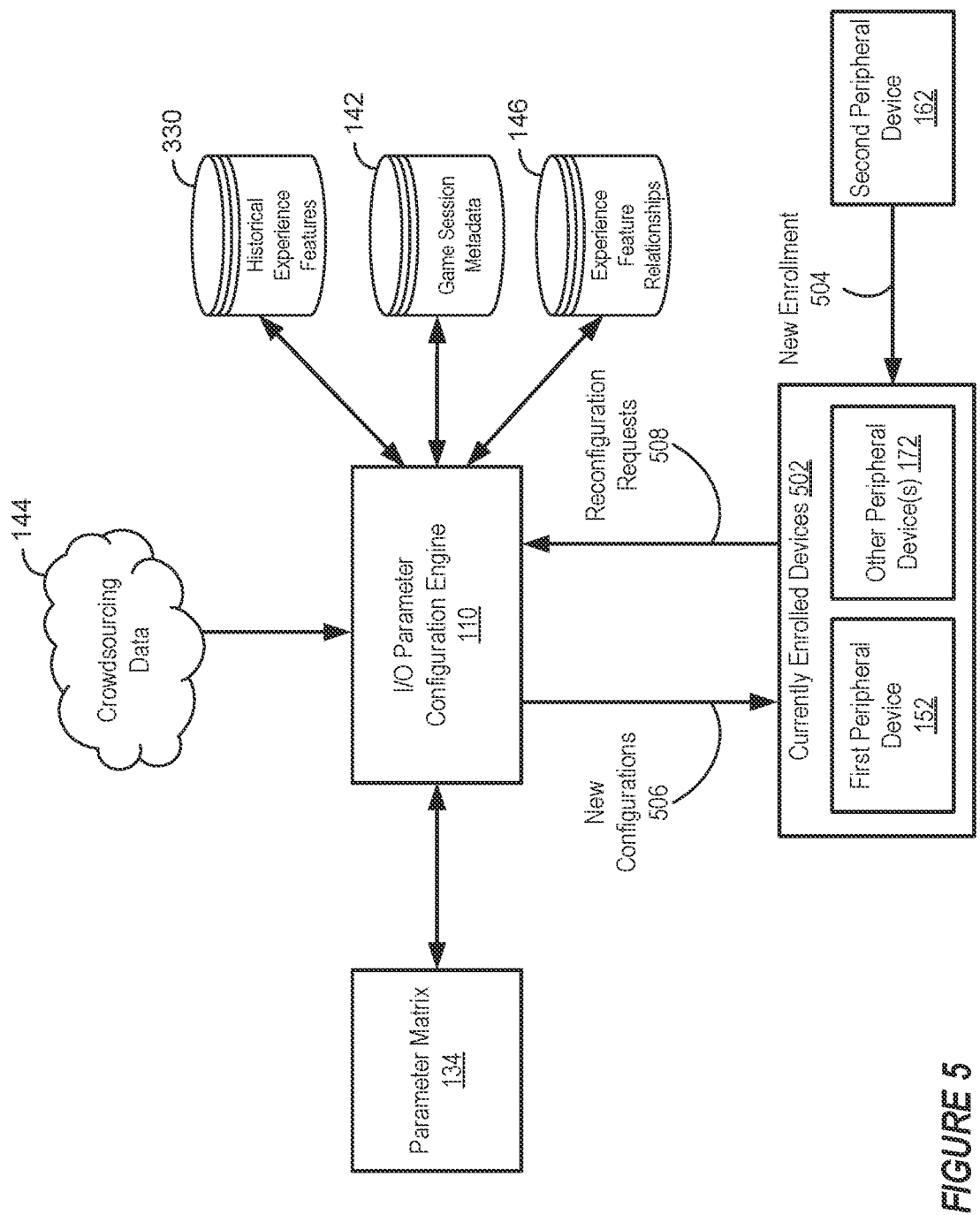
FIG. 5 is a diagram illustrating some example aspects of a gaming system, such as the gaming system of FIG. 1, according to some aspects of the disclosure.

FIG. 5 is a diagram illustrating some example aspects of a gaming system, such as the gaming system 100 of FIG. 1, according to some aspects of the disclosure. In the example of FIG. 5, the I/O parameter configuration engine 110 may perform operations based on one or more of the parameter matrix 134, the crowdsourcing data 144, the historical experience features 330, the game session metadata 142, or the experience feature relationships 146.

To illustrate, the I/O parameter configuration engine 110 may detect a new enrollment 504 among currently enrolled devices 502 (e.g., based on the registration 116 of FIG. 1). The I/O parameter configuration engine 110 may generate a new configuration for a newly enrolled device (e.g., by determining the second setting 166 for the second peripheral device). The new configuration may be included in new configurations 506. Further, the I/O parameter configuration engine 110 may receive reconfiguration requests 508, such as a request to reconfigure the first setting 156 (e.g., in connection with the reconfiguration 114 of FIG. 1). Based on receiving a reconfiguration request 508, the I/O parameter configuration engine 110 may adjust one or more other settings for one or more other devices, such as by adjusting the second setting 166 for the second peripheral device 162.

Figure 6:
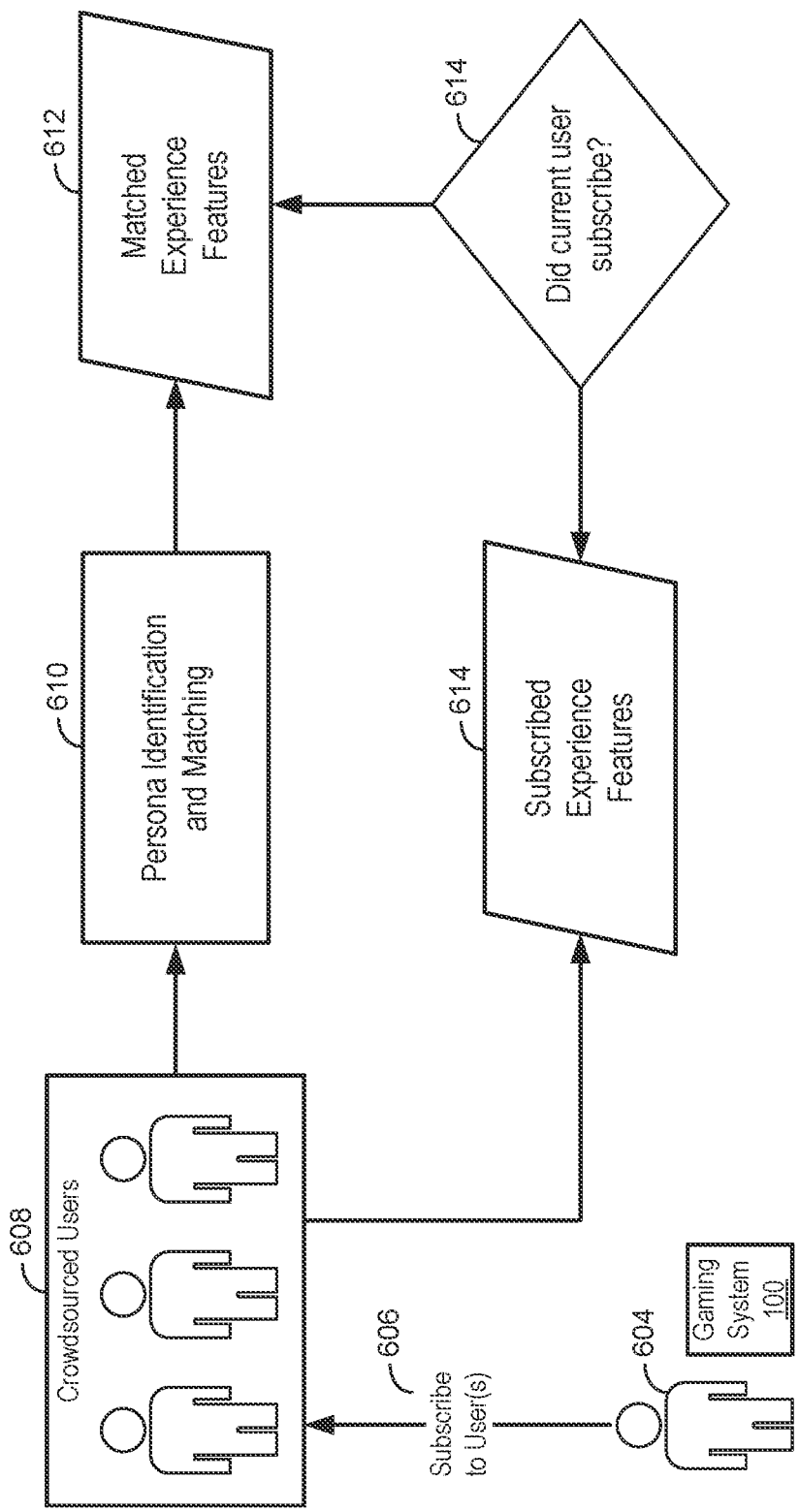
FIG. 6 is another diagram illustrating some example aspects of a gaming system, such as the gaming system of FIG. 1, according to some aspects of the disclosure.

FIG. 6 is another diagram illustrating some example aspects of a gaming system, such as the gaming system 100 of FIG. 1, according to some aspects of the disclosure. Certain examples of FIG. 6 are described with reference to a user 604, such as a user of the gaming system 100 or of one or more of the peripheral devices 150. One or more operations described with reference to FIG. 6 may be performed by the computing device 102. One or more aspects described with reference to FIG. 6 may include using ecosystem experience features of external users as an input to determine the best experience features for a current user.

To illustrate, in FIG. 6, a user persona associated with a user 604 (such as a user of the gaming system 100) may be used to determine one or more users, such as crowdsourced users 608, that are matched to the user, at 610. For example, the computing device 102 may perform persona identification to identify (e.g., using a machine learning process) one or more criteria associated with the user 604, such as one or more of a skill level of the user 604, one or more favorite games of the user 604, one or more favorite game genres of the user 604, one or more peripheral devices (such as any of the peripheral devices 150) utilized by the user 604, an amount of playing time associated with the user 604, or one or more gaming consoles utilized by the user 604, as illustrative examples. The computing device 102 may use persona matching, based on a comparison of the one or more criteria associated with the user 604 to corresponding criteria associated with the crowdsourced users 608, to identify that the crowdsourced users 608 are matched to the user 604 to generate matched experience features 612.

After matching the user 604 to the crowdsourced users 608, experience features of the crowdsourced users 608 may be suggested to the user 604. The user 604 may then be prompted to accept or decline the experience features (e.g., at 614). If the user 604 accepts the experience features (e.g., by subscribing, at 606, to one or more of the crowdsourced users 608), the computing device 102 may reconfigure one or more of the peripheral devices 150 based on subscribed experienced features 614 accepted by the user 604.

Further, in some implementations, reconfigurations of parameters by the crowdsourced users 608 may be "pushed" to the gaming system 100 and used to update one or more settings associated with the gaming system 100. For example, upon a particular crowdsourced user 608 reconfiguring a particular parameter, a device of the particular crowdsourced user 608 may transmit a notification to the computing device 102 indicating the reconfiguration of the particular parameter. The computing device 102 may use the parameter matrix 134 to determine which (if any) settings of the peripheral devices to reconfigure based on the notification.

Figure 7:
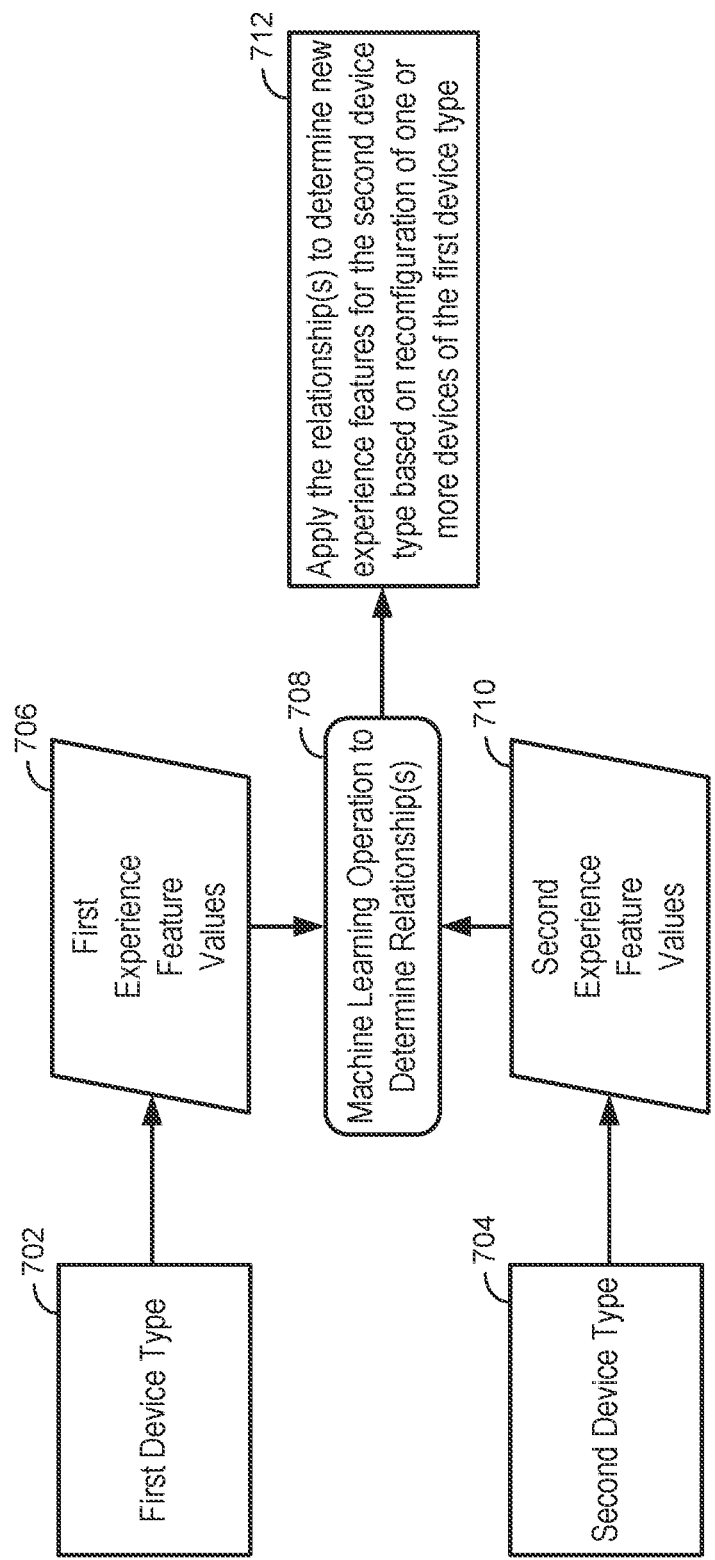
FIG. 7 is another diagram illustrating some example aspects of a gaming system, such as the gaming system of FIG. 1, according to some aspects of the disclosure.

FIG. 7 is another diagram illustrating some example aspects of a gaming system, such as the gaming system 100 of FIG. 1, according to some aspects of the disclosure. One or more operations described with reference to FIG. 7 may be performed by the computing device 102. One or more aspects described with reference to FIG. 6 may include using experience similarity to determine a similarity between experiences for different device types (also referred to herein as device classes).

To illustrate, the computing device 102 may identify one or more first devices of a first device type 702 and may identify one or more second devices of a second device type 704. The one or more first devices may include the first peripheral device 152, and the one or more second devices may include the second peripheral device 162.

The computing device 102 may determine first experience feature values 706 associated with the first device type 702 and may determine second experience feature values 710 associated with the second device type 704. For example, the first experience feature values 706 may indicate parameters of the parameter matrix 134 associated with the first peripheral device 152, and the second experience feature values 710 may indicate parameters of the parameter matrix 134 associated with the second peripheral device 162. The first experience feature values 706 may include the first parameter 154, and the second experience feature values 710 may include the second parameter 164.

The computing device 102 may perform a machine learning operation, at 708, to determine one or more relationships, such as the calibration relationship 126. For example, the computing device 102 may perform the machine learning operation based on the first experience feature values 706 and further based on the second experience feature values 710.

As an illustrative example, the first experience feature values 706 may include a mouse sensitivity, and the second experience feature values 710 may include a joystick sensitivity. During performance of the machine learning operation, the computing device 102 may determine that the mouse sensitivity is correlated with the joystick sensitivity, such as determining that a particular setting of the mouse sensitivity is associated with a particular setting (or range of settings) of the joystick sensitivity.

The computing device 102 may perform the machine learning operation to determine the one or more relationships using one or more techniques. In some implementations, the computing device 102 may determine experience similarity between the first experience feature values 706 and the second experience feature values 710 using a similarity score for experiences associated with device types. In some examples, the score may be determined in a lab setting for each device type and may be applied at runtime. Alternatively or in addition, the computing device 102 may "learn" over time based on user input, such as user input from multiple users in one or more gaming systems (or ecosystems). The computing device 102 may identify experience features that are commonly reconfigured and used together. Alternatively or in addition, the computing device 102 may learn common relationships between experience features in multiple experience configurations across multiple users (e.g., by detecting that when a mouse in an ecosystem is set to approximately 800 DPI, a controller or joystick sensitivity may be set to medium).

The computing device 102 may apply the one or more relationships, at 712, to determine new experience features for the second device type based on reconfiguration of one or more devices of the first device type. For example, the computing device 102 may use the calibration relationship 126 to determine parameter settings for devices of the second device type 704, such as to determine the second setting 166 of the second parameter 164 for the second peripheral device 162.

Figure 8:
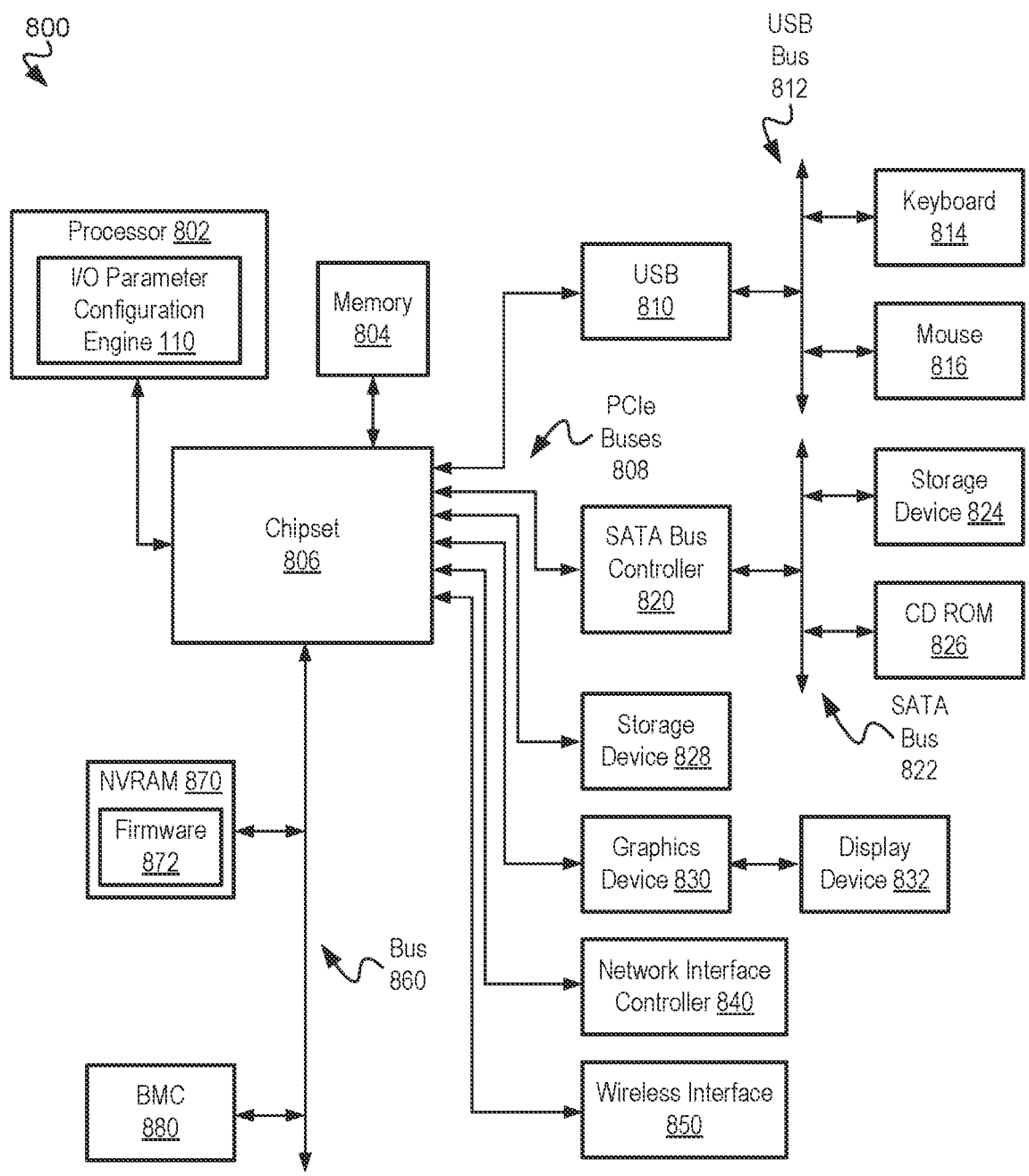
FIG. 8 depicts an illustrative example of an information handling system according to some aspects of the disclosure.

FIG. 8 depicts an illustrative example of an information handling system 800 according to some aspects of the disclosure. Information handling system 800 may include a processor 802 (e.g., a central processing unit (CPU)), a memory 804 (e.g., a dynamic random-access memory (DRAM)), and a chipset 806. In some examples, one or more of the processor 802, the memory 804, or the chipset 806 may be included on a motherboard (also referred to as a mainboard), which may include a printed circuit board (PCB) with embedded conductors organized as transmission lines between any of the processor 802, the memory 804, the chipset 806, or other components of the information handling system 800. The components may be coupled to the motherboard through packaging connections such as a pin grid array (PGA), ball grid array (BGA), land grid array (LGA), surface-mount technology, and/or through-hole technology. In some embodiments, one or more of the processor 802, the memory 804, the chipset 806, or other components may be organized as a system on chip (SoC).

The processor 802 may execute program code by accessing instructions loaded into memory 804 from a storage device, may execute the instructions to operate on data also loaded into memory 804 from a storage device, and may generate output data that is stored to memory 804 or sent to another component. The processor 802 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 802 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 806 may facilitate the transfer of data between the processor 802, the memory 804, and other components. In some embodiments, chipset 806 may include two or more integrated circuits (ICs), such as a northbridge controller coupled to the processor 802, the memory 804, and a southbridge controller, with the southbridge controller coupled to the other components such as universal serial bus (USB) controller 810, a SATA bus controller 820, and PCIe buses 808. The chipset 806 may couple to other components through one or more PCIe buses 808.

Some components may be coupled to one bus line of the PCIe buses 808, whereas some components may be coupled to more than one bus line of the PCIe buses 808. One example component is the USB controller 810, which may interface the chipset 806 to a USB bus 812. The USB bus 812 may couple input/output components, such as a keyboard 814 and a mouse 816, and also other components, such as USB flash drives, or another information handling system. Another example component is the SATA bus controller 820, which may couple the chipset 806 to a SATA bus 822. The SATA bus 822 may facilitate efficient transfer of data between the chipset 806 and components coupled to the chipset 806 and a storage device 824 (e.g., a hard disk drive (HDD) or solid-state disk drive (SDD)) and/or a compact disc read-only memory (CD-ROM) 826. The PCIe buses 808 may also couple the chipset 806 directly to a storage device 828 (e.g., a solid-state disk drive (SDD)). A further example of an example component is a graphics device 830 (e.g., a graphics processing unit (GPU)) for generating output to a display device 832, a network interface controller (NIC) 840, and/or a wireless interface 850 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces). In one example, chipset 806 may be directly connected to an individual end point via a PCIe root port within the chipset and a point-to-point topology as shown in FIG. 8.

The chipset 806 may also be coupled to a bus 860, which may couple the chipset 806 to one or more system management components. For example, a non-volatile random-access memory (NVRAM) 870 storing firmware 872 may be coupled to the bus 860. As another example, a controller, such as a baseboard management controller (BMC) 880, may be coupled to the chipset 806 through the bus 860. BMC 880 may be referred to as a service processor or embedded controller (EC). Capabilities and functions provided by BMC 880 may vary based on the type of information handling system. For example, the term baseboard management system may be used to describe an embedded processor included at a server, while an embedded controller may be found in a consumer-level device. As disclosed herein, BMC 880 may represent a processing device different from processor 802, which provides various management functions for information handling system 800. For example, an embedded controller may be responsible for power management, cooling management, and the like. An embedded controller included at a data storage system may be referred to as a storage enclosure processor or a chassis processor.

Information handling system 800 may include additional processors that are configured to provide localized or specific control functions, such as a battery management controller. Bus 860 can include one or more buses, such as a Serial Peripheral Interface (SPI) bus, an Inter-Integrated Circuit (I2C) bus, a system management bus (SMBUS), a power management bus (PMBUS), or the like. BMC 880 may be configured to provide out-of-band access to devices at information handling system 800. Out-of-band access in the context of the bus 860 may refer to operations performed prior to execution of firmware 872 by processor 802 to initialize operation of the information handling system 800.

Firmware 872 may include instructions executable by processor 802 to initialize and test the hardware components of information handling system 800. For example, the instructions may cause the processor 802 to execute a power-on self-test (POST). The instructions may further cause the processor 802 to load a boot loader or an operating system (OS) from a mass storage device. Firmware 872 additionally may provide an abstraction layer for the hardware, such as a consistent way for application programs and operating systems to interact with the keyboard, display, and other input/output devices. When power is first applied to information handling system 800, the system may begin a sequence of initialization procedures, such as a boot procedure or a secure boot procedure. During the initialization sequence, also referred to as a boot sequence, components of information handling system 800 may be configured and enabled for operation and device drivers may be installed. Device drivers may provide an interface through which other components of information handling system 800 can communicate with a corresponding device. The firmware 872 may include a basic input-output system (BIOS) and/or include a unified extensible firmware interface (UEFI). Firmware 872 may also include one or more firmware modules of the information handling system 800. Additionally, configuration settings for the firmware 872 and firmware of the information handling system 800 may be stored in the NVRAM 870. NVRAM 870 may, for example, be a non-volatile firmware memory of the information handling system 800 and may store a firmware memory map namespace of the information handling system. NVRAM 870 may further store one or more container-specific firmware memory map namespaces for one or more containers concurrently executed by the information handling system.

Information handling system 800 may include additional components and additional buses, not shown for clarity. For example, information handling system 800 may include multiple processor cores (either within processor 802 or separately coupled to the chipset 806 or through the PCIe buses 808), audio devices (such as may be coupled to the chipset 806 through one of the PCIe buses 808), or the like. While a particular arrangement of bus technologies and interconnections is illustrated for the purpose of example, one of skill will appreciate that the techniques disclosed herein are applicable to other system architectures. Information handling system 800 may include multiple processors and/or redundant bus controllers. In some examples, one or more components may be integrated together in an integrated circuit (IC), which may include circuitry built on a common substrate. For example, portions of chipset 806 can be integrated within processor 802. Additional components of information handling system 800 may include one or more storage devices that may store machine-executable code, one or more communications ports for communicating with external devices, and various input and output (I/O) devices, such as a keyboard, a mouse, and a video display.

In some embodiments, processor 802 may include multiple processors, such as multiple processing cores for parallel processing by the information handling system 800. For example, the information handling system 800 may include a server comprising multiple processors for parallel processing. In some embodiments, the information handling system 800 may support virtual machine (VM) operation, with multiple virtualized instances of one or more operating systems executed in parallel by the information handling system 800. For example, resources, such as processors or processing cores of the information handling system may be assigned to multiple containerized instances of one or more operating systems of the information handling system 800 executed in parallel. A container may, for example, be a virtual machine executed by the information handling system 800 for execution of an instance of an operating system by the information handling system 800. Thus, for example, multiple users may remotely connect to the information handling system 800, such as in a cloud computing configuration, to utilize resources of the information handling system 800, such as memory, processors, and other hardware, firmware, and software capabilities of the information handling system 800. Parallel execution of multiple containers by the information handling system 800 may allow the information handling system 800 to execute tasks for multiple users in parallel secure virtual environments.

In some examples, one or more features of the information handling system 800 may correspond to the computing device 102 of FIG. 1. For example, the processor 802 may correspond to the processor 104, and the memory 804 may correspond to the memory 130. In some examples, the processor 802 may execute the I/O parameter configuration engine 110. Further, one or more devices described with reference to FIG. 8 may be included in the peripheral devices 150 of FIG. 1. For example, the keyboard 814 and the mouse 816 may be included in the peripheral devices 150 of FIG. 1.

Figure 9:
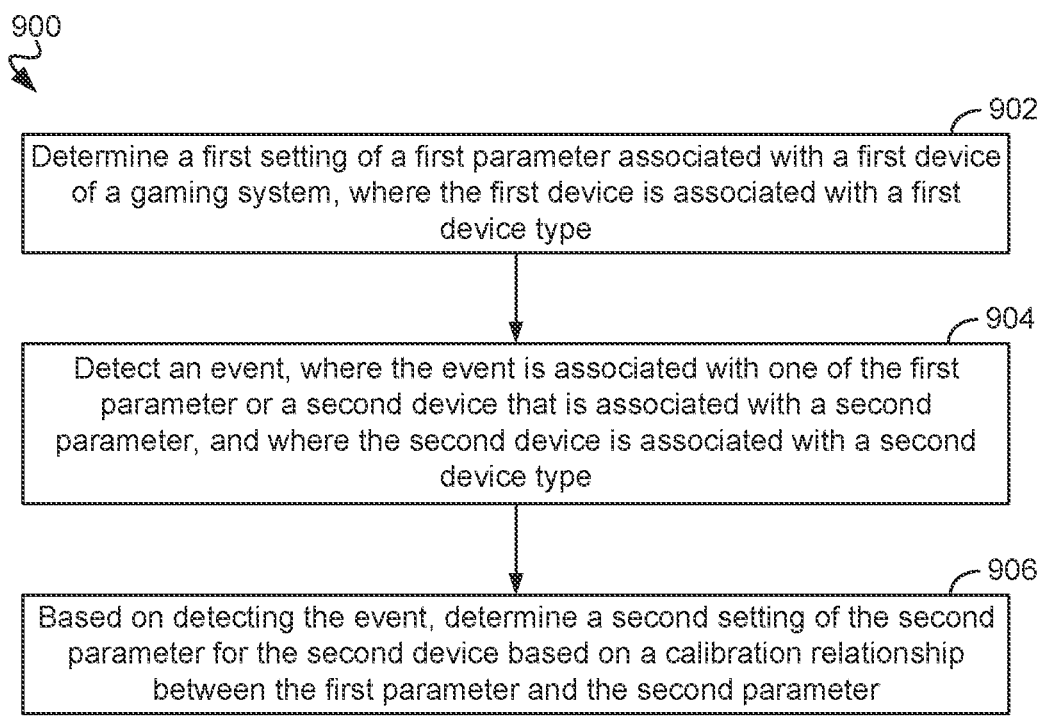
FIG. 9 is a flow chart of an example of a method according to some aspects of the disclosure.

FIG. 9 is a flow chart of an example of a method 900 according to some aspects of the disclosure. In some examples, the method 900 may be performed by one or more devices described herein, such as by the computing device 102 of FIG. 1 or by the information handling system 800 of FIG. 8.

The method 900 includes determining a first setting of a first parameter associated with a first device, at 902. The first device is associated with a first device type. To illustrate, the computing device 102 may determine the first setting 156 of the first parameter 154 associated with the first peripheral device 152. The first peripheral device 152 may be associated with a first device type, such as the first device type 702 of FIG. 7.

In some examples, determining the first setting 156 includes receiving the first setting 156 via a crowdsourcing technique, such as from one of the crowdsourced users 608 of FIG. 6. In some other examples, determining the first setting 156 includes receiving the initial configuration 112 of the first setting 156. In some other examples, determining the first setting 156 includes receiving the reconfiguration 114 of the first setting 156.

The method 900 further includes detecting an event, at 904. The event is associated with one of the first parameter or a second device that is associated with a second parameter, and the second device is associated with a second device type. For example, the computing device 102 may detect the peripheral device configuration event 120, which may be associated with the first parameter 154 or with the second peripheral device 162 that is associated with the second parameter 164. The second peripheral device 162 may be associated with a second device type, such as the second device type 704 of FIG. 7.

To further illustrate, in some examples, detecting the event includes receiving the initial configuration 112 of the first setting 156. In some other examples, detecting the event includes receiving the reconfiguration 114 of the first setting 156. In some other examples, detecting the event includes receiving the registration 116 of the second peripheral device 162 within the gaming system 100.

The method 900 further includes, based on detecting the event, determining a second setting of the second parameter for the second device based on a calibration relationship between the first parameter and the second parameter, at 906. For example, the computing device 102 may determine the second setting 166 based on the calibration relationship 126.

To further illustrate some aspects of the disclosure, in some implementations, users may have access to a shared library of applications. The users may have separate libraries, with some overlapping applications between the libraries. The users may access the library through devices, such as one or more of a mobile gaming device, a tablet computing device, a phone computing device, a television, personal computing device, a desktop computing device, a laptop computing device, a game controller, or a VR headset. The devices may access services at multiple locations, including cars, buses, homes, hotels, offices, parks, etc. One or more of the devices may communicate with an application session executing on a computing device, such as a home application hub, a server, or a cloud execution environment. In some embodiments, environments may only exist for fixed devices, e.g., desktop computers, televisions, etc.

In some examples, a home of a user may include multiple rooms having different information handling systems, different AV equipment, and/or different characteristics. For example, a living room may include a large-size television, a bedroom may include a personal computer, and a dining room may include a table computing device. Gaming environments in the home may be defined based on spaces where a user is likely to execute an application session. Each gaming environment may include numerous devices and gaming environments, devices that may or may not be capable of hosting games, and/or devices that may or may not be capable of receiving game output. A gaming system may allow multiple users in the home to simultaneously execute an application session. In some embodiments, multiple games may be hosted on a single device. In some embodiments, multiple games may target a single output device. In some embodiments, an information handling system may manage where games should be hosted, where game output should go, and how to best route peripheral I/O for users.

A user may move between gaming environments within the home while continuing an application session. For example, a user may take a device, such as a gaming controller, from a first environment to a second environment. The gaming controller may migrate and reconfigure for operation in the second environment from a configuration for the first environment. For example, the controller may transition from an application hosted on a TV in a living room to an application hosted on a TV in a dining room while remaining connected to a host service executing on a PC in a bedroom.

To further illustrate, a first gaming environment may include a device, such as a TV or PC, hosting an application, which may be an endpoint for an application session such as a gaming session. The application communicates with a service, which may be hosted on a device in a different gaming environment. A controller may communicate with the application to receive user input for the application session to control, for example, a character in a game. In some embodiments, the controller is connected to the environment hosting the application and the I/O is configured to be relayed to the environment hosting the actual game.

In another arrangement, the application and services may be hosted in different gaming environments according to some embodiments of the disclosure. The controller may communicate with the service for providing user input to an application session, with the AV rendering target of the application session being an application in a different gaming environment.

In another arrangement, the application and service may be hosted in a common gaming environment. The application and the service may be executed in the same gaming environment, which may be a single device, two devices, or a combination of devices in the gaming environment. The controller may communicate with either the service and/or the application.

In a cloud-based service arrangement for a gaming environment, the controller may communicate with a service hosted in a gaming environment that is remote from the gaming environment in which the application is executing. The service may be executing, for example, on a remote device, such as when the user's home includes the gaming environment but the user is engaging with application at a location on a different network from their home (e.g., at a friend's house). The service may also or alternatively be executed, for example, on a cloud computing device available as a subscription service to the user.

The schematic flow chart diagram of FIG. 3, FIG. 4, FIG. 6, FIG. 7, and FIG. 9 may be generally set forth as a logical flow chart diagram. As such, the depicted order and labeled steps may be indicative of aspects of the disclosed method. Other operations and methods may be implemented that are corresponding in function, logic, or effect to one or more operations, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding operations shown.

Machine learning operations, as described herein, may include logistic regression techniques, linear discriminant analysis, linear regression analysis, artificial neural networks, machine learning classifier processes, or classification/regression trees in some implementations. In various other implementations, machine learning systems may employ naive Bayes predictive modeling analysis of several varieties, learning vector quantization artificial neural network processes, or implementation of boosting processes such as Adaboost or stochastic gradient boosting systems for iteratively updating weighting to train a machine learning classifier to determine a relationship between an influencing attribute, such as any attribute of the calibration data 128.

One or more operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver that transmits and receives signals indicative of instructions and data. The instructions and data may cause one or more processors to implement one or more operations described herein.

Although the present disclosure and certain representative advantages have been described in detail, it should be understood that various changes, substitutions and alterations can be made herein without departing from the scope of the disclosure as defined by the appended claims. Moreover, the scope of the present application is not intended to be limited to the particular implementations of the process, machine, manufacture, composition of matter, means, methods, and steps described in the specification. For example, although processors are described throughout the detailed description, one or more aspects described herein may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to

What is claimed is:

1. An apparatus comprising:
 a memory; and
 one or more processors coupled to the memory and configured to:
 execute a host service for streaming a game application to a display device;
 determine a first setting of a first parameter associated with a first device;
 detect an event, wherein the event is associated with one of the first parameter or a second device that is associated with a second parameter;
 based on detecting the event, determine a second setting of the second parameter for the second device based on a calibration relationship between the first parameter and the second parameter; and
 receiving user input for the game application from the second device based on the second setting of the second parameter for the second device.

2. The apparatus of claim 1, wherein the one or more processors are further configured to access, based on detecting the event, a parameter matrix that indicates that the first parameter corresponds to the second parameter.

3. The apparatus of claim 2, wherein the parameter matrix indicates:
 a plurality of devices;
 a plurality of parameters; and
 for each parameter of the plurality of parameters and for each device of the plurality of devices, an indication of whether the parameter is associated with the device.

4. The apparatus of claim 2, wherein the one or more processors are further configured to update the parameter matrix to indicate that the second device is associated with one or more parameters including the second parameter.

5. The apparatus of claim 1, wherein the one or more processors are further configured to determine the calibration relationship based on calibration data.

6. The apparatus of claim 5, wherein the calibration data includes one or more of game session metadata associated with a particular game, crowdsourcing data indicating detected values associated with the first parameter and the second parameter, experience feature relationships between the first parameter and the second parameter, or device metadata associated with one or more of the first device or the second device.

7. The apparatus of claim 6, wherein the experience feature relationships indicate a correlation between the first parameter and the second parameter, and wherein the one or more processors are further configured to:
 determine a first amount of change associated with the first parameter;
 based on the correlation and the first amount of change, determine a second amount of change for the second parameter; and
 adjust a current value of the second parameter based on the second amount of change to determine the second setting.

8. The apparatus of claim 1, wherein the one or more processors are further configured to detect the event by detecting that a configuration profile does not indicate the second device and to store an indication of the second setting of the second parameter to the configuration profile.

9. The apparatus of claim 8, wherein the configuration profile corresponds to one or more of a particular game associated with a gaming system, a particular player of the gaming system, or a particular geographic location associated with the gaming system.

10. The apparatus of claim 1, wherein the one or more processors are further configured to detect the event based on one of receiving an initial configuration of the first setting, receiving a reconfiguration of the first setting, or receiving the first setting via a crowdsourcing technique.

11. The apparatus of claim 1, wherein the one or more processors are further configured to detect the event based on one of receiving an initial configuration of the first setting, receiving a reconfiguration of the first setting, or receiving registration of the second device within a gaming system.

12. The apparatus of claim 1, wherein the one or more processors are further configured to perform a machine learning operation to determine the calibration relationship based on first experience feature values associated with the first device and further based on second experience feature values associated with the second device.

13. The apparatus of claim 1, further comprising an information handling system that includes the memory and the one or more processors.

14. A method comprising:
 executing a host service for streaming a game application to a display device;
 determining a first setting of a first parameter associated with a first device;
 detecting an event, wherein the event is associated with one of the first parameter or a second device that is associated with a second parameter;
 based on detecting the event, determining a second setting of the second parameter for the second device based on a calibration relationship between the first parameter and the second parameter; and
 receiving user input for the game application from the second device based on the second setting of the second parameter for the second device.

15. The method of claim 14, further comprising, based on detecting the event, accessing a parameter matrix that indicates that the first parameter corresponds to the second parameter.

16. The method of claim 15, wherein the parameter matrix indicates:
 a plurality of devices;
 a plurality of parameters; and
 for each parameter of the plurality of parameters and for each device of the plurality of devices, an indication of whether the parameter is associated with the device.

17. The method of claim 15, further comprising updating the parameter matrix to indicate that the second device is associated with one or more parameters including the second parameter.

18. An information handling system comprising:
 a memory;
 a processor coupled to the memory, wherein the processor is configured to perform operations comprising:
 executing a host service for streaming a game application to a display device;
 determining a first setting of a first parameter associated with a first device;
 detecting an event, wherein the event is associated with one of the first parameter or a second device that is associated with a second parameter;
 based on detecting the event, determining a second setting of the second parameter for the second device based on a calibration relationship between the first parameter and the second parameter; and receiving user input for the game application from the second device based on the second setting of the second parameter for the second device.

19. The information handling system of claim 18, wherein the processor is further configured to detect the event based on one of receiving an initial configuration of the first setting, receiving a reconfiguration of the first setting, or receiving the first setting via a crowdsourcing technique.

20. The information handling system of claim 18, wherein the processor is further configured to detect the event based on one of receiving an initial configuration of the first setting, receiving a reconfiguration of the first setting, or receiving registration of the second device within a gaming system.

* * * * *